United States Patent
Liu

(10) Patent No.: US 8,285,509 B2
(45) Date of Patent: Oct. 9, 2012

(54) METHOD AND SYSTEM OF TESTING ELECTRONIC DEVICE

(75) Inventor: Qing-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 367 days.

(21) Appl. No.: 12/715,652

(22) Filed: Mar. 2, 2010

(65) Prior Publication Data

US 2011/0161039 A1    Jun. 30, 2011

(30) Foreign Application Priority Data

Dec. 29, 2009   (CN) .......................... 2009 1 0312544

(51) Int. Cl.
*G06F 19/00* (2011.01)

(52) U.S. Cl. ....... 702/108; 702/113; 714/33; 714/38.11; 714/742; 714/731

(58) Field of Classification Search ................. 702/108, 702/113; 714/33, 38.11, 742, 731
See application file for complete search history.

(56) References Cited

U.S. PATENT DOCUMENTS

| | | | |
|---|---|---|---|
| 7,809,520 B2 * | 10/2010 | Adachi | 702/119 |
| 7,840,844 B2 * | 11/2010 | Garland et al. | 714/33 |
| 7,924,043 B2 * | 4/2011 | Schroth et al. | 324/762.01 |
| 2003/0208712 A1 * | 11/2003 | Louden et al. | 714/742 |
| 2006/0282736 A1 * | 12/2006 | Schroth et al. | 714/742 |
| 2008/0256392 A1 * | 10/2008 | Garland et al. | 714/33 |
| 2009/0259428 A1 * | 10/2009 | Schroth et al. | 702/108 |
| 2010/0198088 A1 * | 8/2010 | Ortenberg et al. | 600/501 |
| 2010/0229058 A1 * | 9/2010 | Goyal et al. | 714/731 |
| 2010/0268506 A1 * | 10/2010 | Chou et al. | 702/113 |

FOREIGN PATENT DOCUMENTS

EP    1050797 A1 *  11/2000

* cited by examiner

*Primary Examiner* — Carol Tsai
(74) *Attorney, Agent, or Firm* — Altis Law Group, Inc.

(57) ABSTRACT

A method of testing an electronic device is disclosed. The electronic device includes an embedded controller. The method includes storing a type information of the embedded controller and transmitting the type information to an application module through a data module. The application module analyzes the type information to obtain a command. The application module sends the command to the embedded controller. The embedded controller returns a testing result to the application module. The application module generates a testing report after the application module compares the testing result with a predetermined result.

16 Claims, 3 Drawing Sheets

METHOD AND SYSTEM OF TESTING ELECTRONIC DEVICE

BACKGROUND

1. Technical Field

The present disclosure relates to a test method and system of an electronic device.

2. Description of Related Art

Electronic devices (such as a notebook computer) have embedded controllers. Each embedded controller may store battery temperature information, fan speed information, power information, and so on. Therefore, when the electronic device is tested, the embedded controller is read to obtain the corresponding information using embedded controller commands However, different electronic devices use different embedded controller commands. When a person tests one electronic device, they must use the corresponding command. If the person tests another electronic device, they must use another command corresponding to different electronic device. It is not convenient to test different electronic devices.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java or C. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
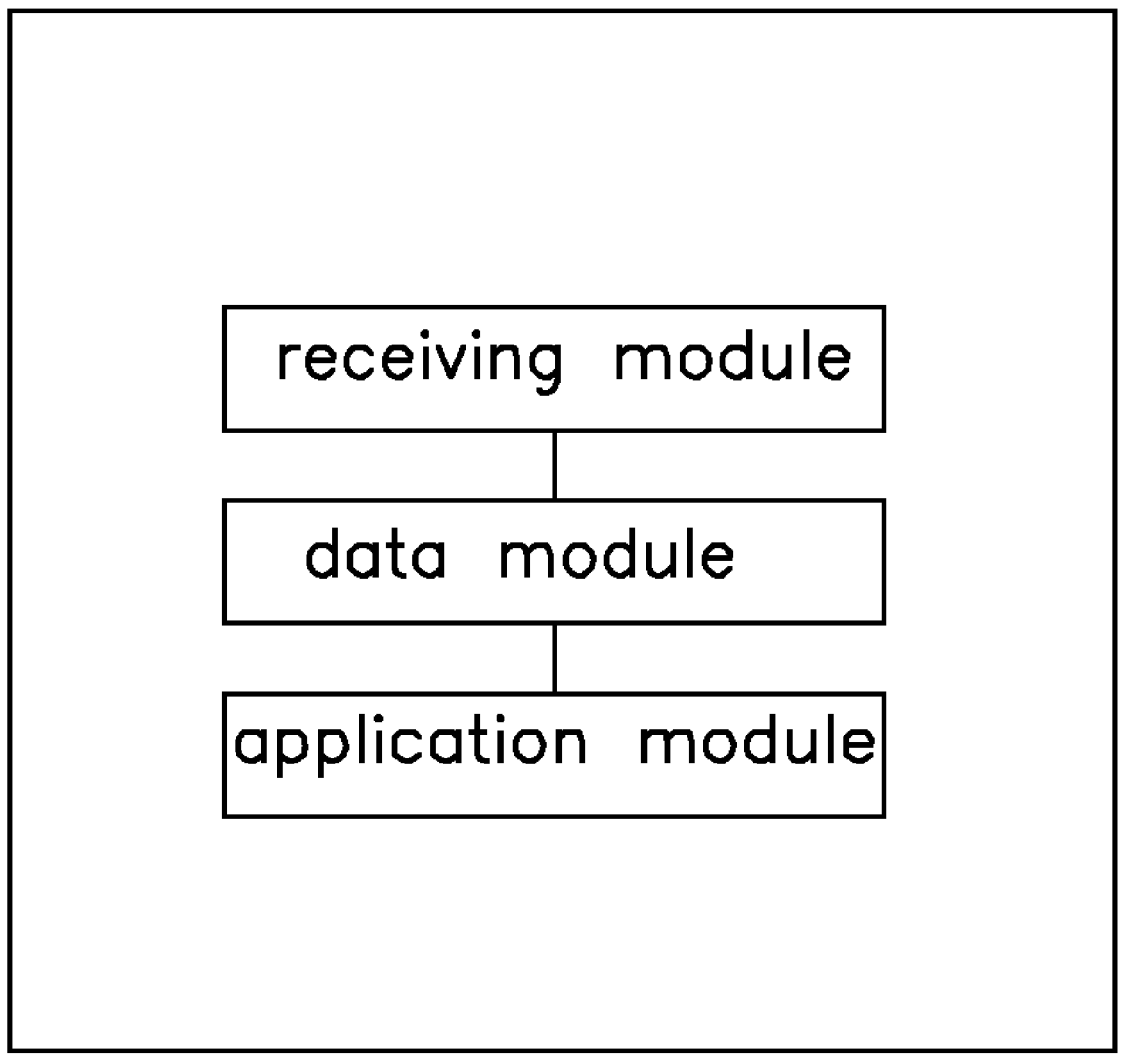
FIG. 1 is a block diagram of a system of testing an electronic device in accordance with one embodiment.

Referring to FIG. 1, a system of testing an electronic device includes a receiving module, a data module and an application module. The electronic device includes an embedded controller. A user manually enters a type information of the electronic device into the receiving module which sends the type information to the data module for storing. The data module stores the type information of the embedded controller and transmits the type information to the application module. The application module analyzes the type information to obtain a corresponding testing command associated with the type information. The application module sends the testing command to the embedded controller. The embedded controller returns a test result to the application module according to the testing command. The application module makes a test report after the application module compares the test result with a predetermined result.

Figure 2:
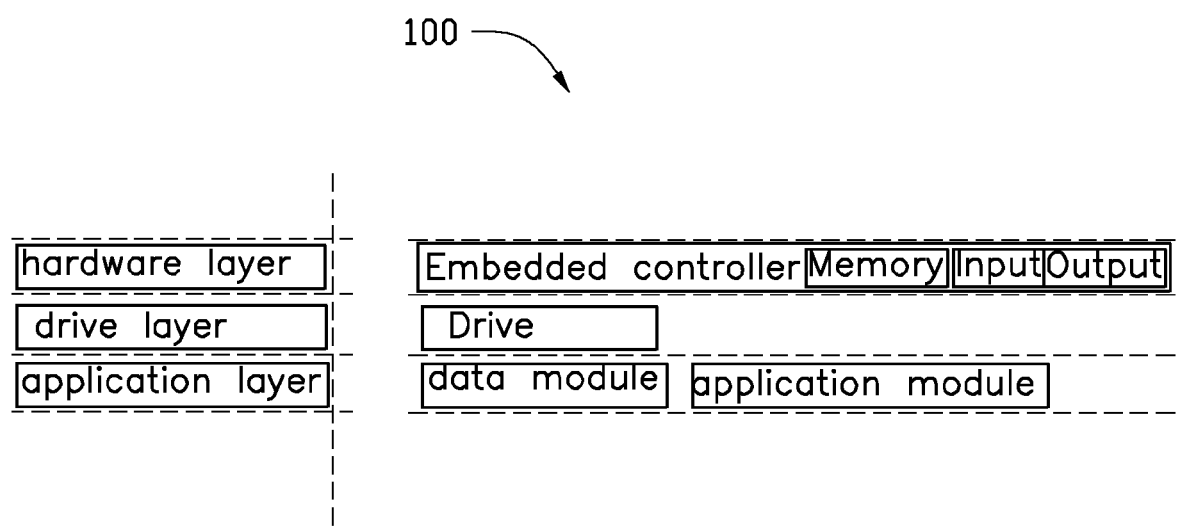
FIG. 2 is a layer view of a system of testing an electronic device in accordance with one embodiment.

Referring to FIG. 2, there are many layers in the electronic device 100. For example, there can be an application layer, a drive layer, and a hardware layer. The embedded controller, a single chip, is located at the hardware layer. The embedded controller stores, for example, battery temperature information, fan speed information, and power information of the electronic device.

The application module sends the command to the embedded controller through a drive to read a memory in the embedded controller where test results are stored. The drive reads the memory via an input/output port of the embedded controller. The drive is located at the drive layer.

The application module is located at the application layer. The application module includes some functions. In one embodiment, a sending command function, sendEcAcpiCmd (BYTE byCmd, BYTE byAddress, BYTE *byInputData, BYTE *byOutputData), byCmd expresses a read/write command, 0×80 value expresses to read, 0×81 value expresses to write; byAddress expresses addresses; *byInputData expresses an input parameter; *byOutputData expresses to return a testing result.

The data module is also located on the application layer. In one embodiment, in the data module, AEIREAD expresses to read an expanded command of the embedded controller; 0×A2 expresses the input parameter; 0×38 expresses to execute 0×38 command.

Figure 3:
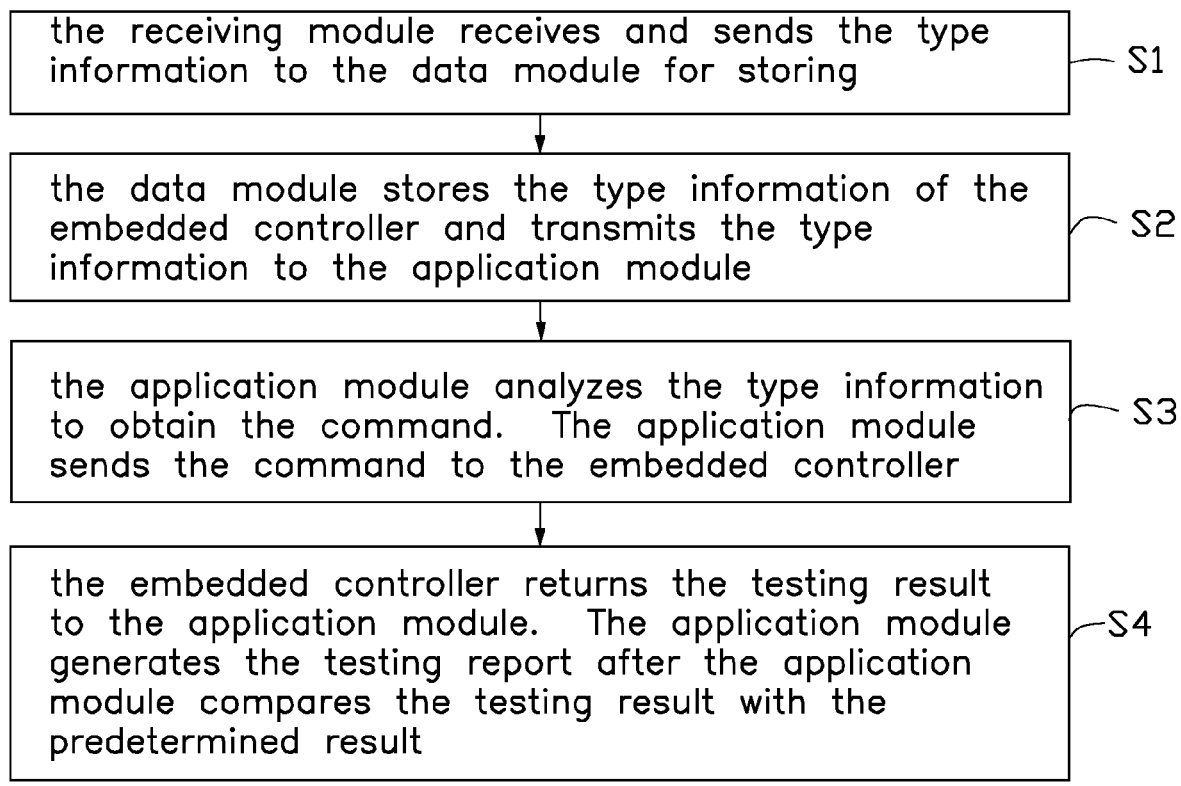
FIG. 3 is a flowchart of a method of testing an electronic device in accordance with one embodiment.

Referring to FIG. 3, one embodiment of a method of testing an electronic device includes the following blocks.

In block S1, the receiving module receives and sends the type information to the data module for storing.

In block S2, the data module stores the type information of the embedded controller and transmits the type information to the application module.

In block S3, the application module analyzes the type information to obtain the command. The application module sends the command to the embedded controller.

In block S4, the embedded controller returns the test result to the application module. The application module generates a test report after the application module compares the test result with the predetermined result. The command comprises an expanded command capable of writing information in the embedded controller. The test result may include, for example, fan speed information, battery temperature information, and power information.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method of testing an electronic device, the electronic device comprising of an embedded controller, the method comprising:

storing a type information of the embedded controller and transmitting the type information to an application module through a data module;

analyzing the type information to obtain a testing command by the application module;

sending the testing command to the embedded controller through a drive to read a memory in the embedded controller by the application module;

returning a testing result to the application module through the embedded controller; and generating a testing report after the application module compares the testing result with a predetermined result.

2. The method of claim 1, wherein the testing command comprises an expanded command, and the expanded command writes information to the embedded controller.

3. The method of claim 1, wherein the application module sends the testing command to the embedded controller to obtain power information.

4. The method of claim 1, wherein a receiving module receives and sends the type information to the data module.

5. The method of claim 1, wherein the testing result comprises fan rotation speed information.

6. The method of claim 1, wherein the memory stores the testing result.

7. The method of claim 1, wherein the drive reads the memory via an input/output port of the embedded controller.

8. The method of claim 1, wherein the testing result comprises battery temperature information.

9. A system of testing an electronic device, the electronic device comprising of an embedded controller, the system comprising:

a data module capable of storing a type information of the embedded controller and transmitting the type information to an application module;

the application module capable of analyzing the type information to obtain a testing command;

the application module capable of sending the testing command to the embedded controller through a drive to read a memory in the embedded controller;

the embedded controller capable of receiving a testing result from the application module;

the application module capable of generating a testing report when the application module compares the testing result with a predetermined result.

10. The system of claim 9, wherein the testing command comprises an expanded command capable of writing information in the embedded controller.

11. The system of claim 9, wherein the application module is capable of sending the command to the embedded controller to obtain power information.

12. The system of claim 9, wherein a receiving module is capable of receiving and sending the type information to the data module for storing.

13. The system of claim 9, wherein the testing result comprises fan rotation speed information.

14. The system of claim 9, wherein the memory is capable of storing the testing result.

15. The system of claim 9, wherein the drive is capable of reading the memory via an input/output port of the embedded controller.

16. The system of claim 9, wherein the testing result comprises battery temperature information.

* * * * *